(12) United States Patent
Chen

(10) Patent No.: US 11,453,067 B2
(45) Date of Patent: Sep. 27, 2022

(54) ASSEMBLING AND CENTERING STRUCTURE FOR PROCESSING TOOL

(71) Applicant: Yih Troun Enterprise Co., Ltd., New Taipei (TW)

(72) Inventor: Li-Cheng Chen, New Taipei (TW)

(73) Assignee: Yih Troun Enterprise Co., Ltd., New Taipei (TW)

( * ) Notice: Subject to any disclaimer, the term of this patent is extended or adjusted under 35 U.S.C. 154(b) by 120 days.

(21) Appl. No.: 16/979,282

(22) PCT Filed: Mar. 4, 2019

(86) PCT No.: PCT/CN2019/076867
§ 371 (c)(1),
(2) Date: Sep. 9, 2020

(87) PCT Pub. No.: WO2019/174488
PCT Pub. Date: Sep. 19, 2019

(65) Prior Publication Data
US 2021/0370413 A1 Dec. 2, 2021

(30) Foreign Application Priority Data

Mar. 15, 2018 (CN) .......................... 201810214725.9

(51) Int. Cl.
*B23C 5/10* (2006.01)
*B23B 29/12* (2006.01)
*B23Q 3/12* (2006.01)

(52) U.S. Cl.
CPC ................ *B23B 29/12* (2013.01); *B23Q 3/12* (2013.01)

(58) Field of Classification Search
CPC ............ B23B 51/0002; B23B 51/0003; B23B 51/0004; B23B 51/0473; B23B 2240/00;
(Continued)

(56) References Cited

U.S. PATENT DOCUMENTS 4,834,597 A   5/1989  Andersson et al.
5,163,790 A  11/1992  Vig
(Continued)

FOREIGN PATENT DOCUMENTS

CN     101069952 A    11/2007
CN     201889658 U     7/2011
(Continued)

*Primary Examiner* — Alan Snyder
(74) *Attorney, Agent, or Firm* — Alan D. Kamrath; Karin L. Williams; Mayer & Williams PC

(57) ABSTRACT

Disclosed is an assembling and centering structure for a processing tool, the structure having a clamping handle (10), a processing head (20), and a fastening member (30) for connecting and fixing the clamping handle (10) and the processing head (20). An end face accommodation groove (100) of the clamping handle (10) is formed with a concave part (11) and a centering hole (12). The processing head (20) is formed with a convex part (211) and a centering post (222), the convex part (211) matches the concave part (11), and the centering post (222) matches the centering hole (12). Thus, it can be ensured that after assembly, the central axis of rotation of the clamping handle (10) is in a straight line with the central axis of rotation of the processing head (20).

10 Claims, 10 Drawing Sheets

(58) Field of Classification Search
CPC ............ B23C 2210/02; B23C 2240/24; B23C 2240/00; B23C 5/26
USPC .................................................. 408/239 R
See application file for complete search history.

(56) References Cited

U.S. PATENT DOCUMENTS

| | | | |
|---|---|---|---|
| 5,607,263 | A | 3/1997 | Nespeta et al. |
| 7,153,071 | B2 | 12/2006 | Blomberg et al. |
| 7,717,653 | B2 | 5/2010 | Miyata et al. |
| 8,308,404 | B2 | 11/2012 | Ostermann et al. |
| 8,899,891 | B2 | 12/2014 | Freyermuth et al. |
| 2008/0166198 | A1 | 7/2008 | Stojanavski |
| 2011/0158759 | A1 | 6/2011 | Jansen et al. |
| 2020/0198020 | A1* | 6/2020 | Moerk ................. B23C 5/26 |

FOREIGN PATENT DOCUMENTS

| | | |
|---|---|---|
| CN | 201997731 U | 10/2011 |
| CN | 101155655 A | 2/2012 |
| CN | 102378662 A | 3/2012 |
| CN | 205888196 U | 1/2017 |
| CN | 107457440 A | 12/2017 |
| CN | 207043350 U | 2/2018 |
| DE | 102009031607 A1 | 1/2011 |
| DE | 102010015934 A1 | 9/2011 |
| EP | I366840 B1 | 12/2003 |
| JP | H8507003 A | 7/1996 |
| JP | 2011136413 A | 7/2011 |
| RU | 2519192 C2 | 6/2014 |
| RU | 2556252 C2 | 7/2015 |
| TW | M386953 U | 8/2010 |
| TW | 201742700 A | 12/2017 |

* cited by examiner

ASSEMBLING AND CENTERING STRUCTURE FOR PROCESSING TOOL

BACKGROUND OF THE INVENTION

1. Field of the Invention

The present invention relates to a processing tool (aka machine tool), especially to a structure of a processing tool for assembling and positioning a center of the processing tool.

2. Description of the Prior Arts

In mechanical processing, normally, a tool machine drives a tool to cut a workpiece. The tool may be static or rotatable in operation, such as a milling cutter, a drill bit, a turning tool, a punch bit and so on for cutting or stamping.

U.S. Pat. No. 4,834,597, China Patent No. 101155655, China Patent Application No. 107457440, and Taiwan Patent Application No. 201742700 provide some information about conventional processing tools. For example, according to Taiwan Patent Application No. 201742700, an assembling structure of a processing tool mainly comprises a clamping handle, a tool, and a fixing part. The tool is fixed on the clamping handle via the fixing part. Precisely, the clamping handle has a receiving cavity on an end surface thereof. An inner wall of the receiving cavity forms multiple curved surfaces, and radiuses of curvatures of the curved surfaces are the same but centers of the curvatures of the curved surfaces are different. The tool comprises an assembling portion that protrudes toward the clamping handle and thus the assembling portion can be engaged in the receiving cavity of the clamping handle. In other words, corresponding to the inner wall of the receiving cavity, an outer wall of the assembling portion forms multiple curved surfaces with same radiuses of curvatures but different centers of the curvatures.

Therefore, if the tool is worn after utilized for a long time, the worn part, instead of the whole tool, can be changed so that resources may be saved and the cost may be reduced. However, during assembly of the processing tool which has aforesaid assembling structure, an axis of the tool and an axis of the clamping handle may not be aligned to each other because of manufacture error or assembly error as shown in FIG. 9, such that the quality of the workpiece is diminished. If the axes are oblique with respect to each other to a large degree, the processing tool may be damaged. Therefore, how to line up the axes of the tool 91 and the clamping handle 92 is an important task.

On the contrary, as shown in FIG. 10, because errors may arise inevitably during manufacturing and processing, the dimensions or locations of the component may deviate from expectation. If the errors are significant, the products shaped by the tool may also have significant errors, or the tool cannot be mounted on a holder of a processing tool. In current technology, the precision to manufacture a cylinder 93 is very high. Though errors are still inevitable, the error may not affect assembly or use. However, the precision to manufacture a non-cylinder 94 is lower. For example, during manufacture of the aforesaid curved surfaces which have the same radiuses of curvatures but different centers of the curvatures, the locations of the curved surface are prone to deviate. According to U.S. Patent Publication No. 2008/0166198, because the component 47 is non-cylinder, the component 47 may not be mounted on the tool but be stuck at the opening of the through hole. Besides, to put the component 47 into the space 33, the dimensions of the component 47 should be slightly larger than those of the space 33, so a gap may be formed between a wall of the space 33 and the component 47. If the gap exists between the wall of the space 33 and the component 47, when the tool changes the rotation direction, the component 47 may be displaced with respect to the holder of the processing tool, which loosens the screw.

As a result, finding a better improvement for this field is urgent.

SUMMARY OF THE INVENTION

The main objective of the present invention is to provide a positioning assembling structure of a center of a processing tool that may assist with assembling the processing tool and thus the axis of the processing tool and the axis of the clamping handle may be aligned.

The positioning assembling structure has a clamping handle, a processing head, and a fixing part. The clamping handle comprises a receiving cavity. The receiving cavity is formed at an end surface of the clamping handle and comprises a recess and a central positioning hole. The recess is adjacent to an opening of the receiving cavity and includes a plurality of curved surfaces. Radiuses of curvatures of the curved surfaces are the same but centers of the curvatures of the curved surfaces are different. A wall of the central positioning hole is a cylindrical surface. The central positioning hole is farther from the opening of the receiving cavity than the recess. A width of the recess is gradually decreased toward the central positioning hole thereby forming the recess in a conical shape. The processing head comprises a cutting portion and an assembling portion. The cutting portion is used for machining a workpiece. The assembling portion is securely mounted on the cutting portion and in the receiving cavity of the clamping handle, and comprises a protrusion and a central positioning column. The protrusion matches and is received in the recess and includes a plurality of curved surfaces. A number of the curved surfaces of the protrusion is equal to that of the curved surfaces of the recess. Radiuses of curvatures of the curved surfaces of the processing head are the same but centers of the curvatures of the curved surfaces of the processing head are different. A wall of the central positioning hole is a cylindrical surface. The central positioning column matches and is received in the central positioning hole. The central positioning column is farther from the cutting portion than the protrusion. A width of the protrusion is gradually decreased toward the central positioning column thereby forming the protrusion in a conical shape. The fixing part is connected with the clamping handle and the processing head. When the assembling portion is received in the receiving cavity, each one of the curved surfaces of the protrusion abuts a respective one of the curved surfaces of the recess, and a rotating axis of the clamping handle and a rotating axis of the processing head are arranged in a line.

The advantages of the present invention are: the receiving cavity of the clamping handle has the recess and the central positioning hole that are different in dimensions, and the assembling portion of the processing head has the protrusion corresponding to the recess and the central positioning column corresponding to the central positioning hole, so when assembling the clamping handle and the processing head, the assembling portion of the processing head is put into the receiving cavity of the clamping handle in two steps. Through the two steps, the rotating axis of the processing head and the rotating axis of the clamping handle can be aligned to each other, and the processing head needs to be rotated to correct an angle for engaging with the clamping handle. Therefore, the processing head can be securely mounted on the clamping handle and is not oblique to the clamping handle in any direction, and thereby the processing head may not be detached from the clamping handle because of vibrations during a machining process. Besides, with the recess being in a conical shape and the width of the recess gradually decreased toward the central positioning hole, and with the protrusion being in a conical shape and the width of the protrusion gradually decreased toward the central positioning column, even any one of the recess and the protrusion has an error during manufacturing, the processing head still can be mounted on the clamping handle. Further, when the clamping handle changes the rotation direction, the curved surfaces of the protrusion are kept abutting the curved surfaces of the recess just like without the error.

In the aforesaid positioning assembling structure of a center of a processing tool, the receiving cavity of the clamping handle further comprises a stepped surface and the stepped surface of the clamping handle is located between the recess and the central positioning hole. The assembling portion of the processing head also comprises a stepped surface and the stepped surface is located between the protrusion and the central positioning column. A thickness of the protrusion in a direction parallel to the rotating axis of the processing head is lesser than a depth of the recess in said direction. The stepped surface of the clamping handle faces to the stepped surface of the processing head and a gap is formed between the stepped surface of the clamping handle and the stepped surface of the processing head.

In the aforesaid positioning assembling structure of a center of a processing tool, the processing head further comprises a connecting portion. The connecting portion is located between the cutting portion and the assembling portion and thereby the assembling portion is securely mounted on the cutting portion via the connecting portion. Sectional dimensions and a sectional shape of the connecting portion are identical to those of the clamping handle.

In the aforesaid positioning assembling structure of a center of a processing tool, the clamping handle further comprises a through hole and the through hole is formed through the rotating axis of the clamping handle. The processing head further comprises a space and the space is concaved in a surface of the processing head; said surface of the processing head faces to the clamping handle. The space faces and communicates to the through hole of the clamping handle. The fixing part is mounted through and screwed in the through hole and the space.

In the aforesaid positioning assembling structure of a center of a processing tool, the clamping handle further comprises a space and the space is concaved in a surface of the clamping handle; said surface of the clamping handle faces to the processing head. The processing head further comprises a through hole and the through hole is formed through the rotating axis of the processing head. The through hole faces and communicates to the space of the clamping handle. The fixing part is mounted through and screwed in the through hole and the space.

DESCRIPTIONS OF REFERENCE NUMERALS

| 10 | clamping handle | 100 | receiving cavity |
|----|----|----|----|
| 11 | recess | 12 | central positioning hole |
| 13 | stepped surface | 14 | through hole |
| 20 | processing head | 21 | cutting portion |
| 22 | assembling portion | 221 | protrusion |
| 222 | central positioning column | 223 | stepped surface |
| 23 | connecting portion | 24 | space |
| 30 | fixing part | | |
| 10A | clamping handle | 14A | space |
| 20A | processing head | 24A | through hole |
| X | axis | Y | axis |

DETAILED DESCRIPTION OF THE PREFERRED EMBODIMENTS

In the following, with the drawings and preferred embodiments of the present invention, the technical means adopted by the present invention to achieve the intended purpose of the invention are further described.

Figure 1:
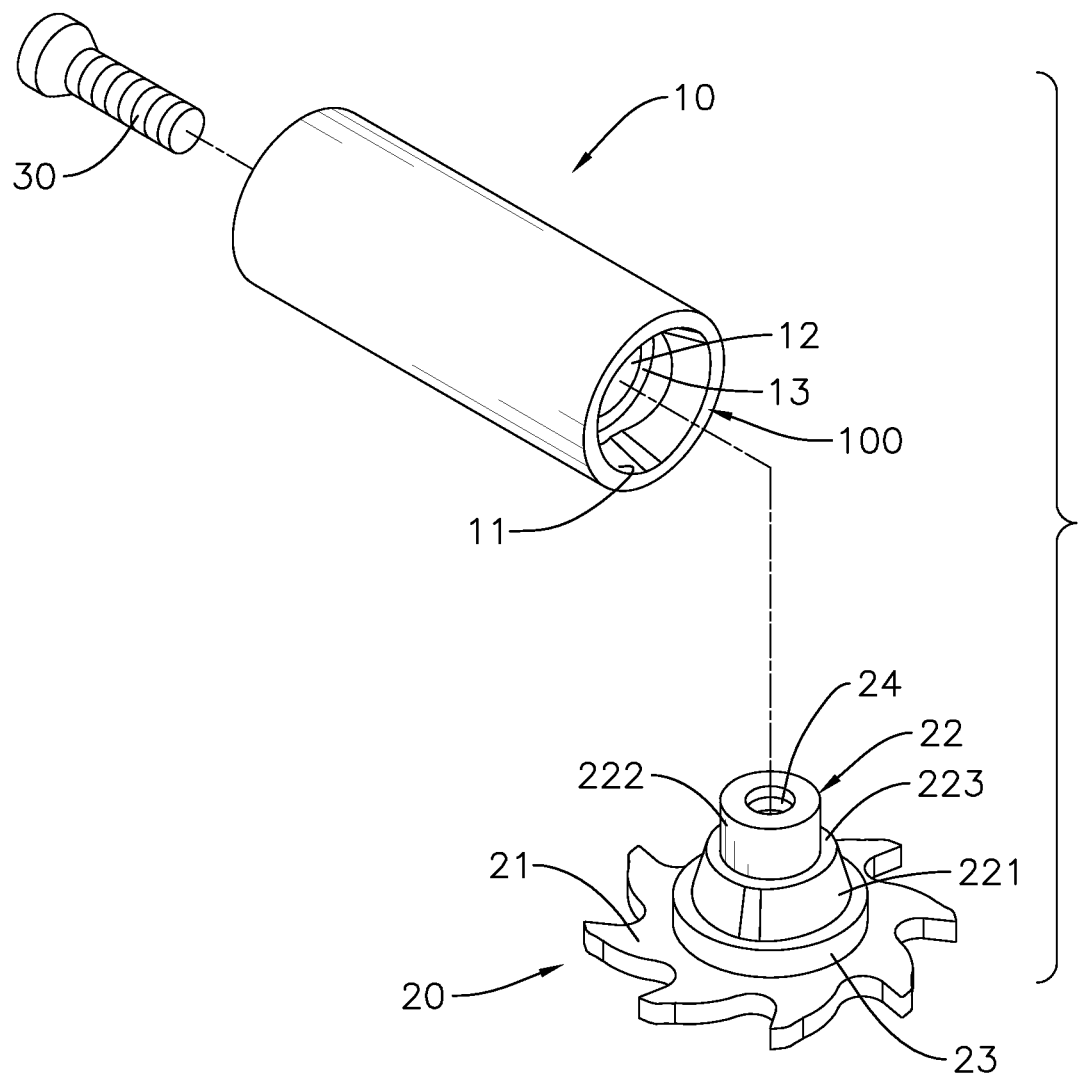
FIG. 1 is an exploded perspective view in accordance with a first embodiment of the present invention.
Figure 2:
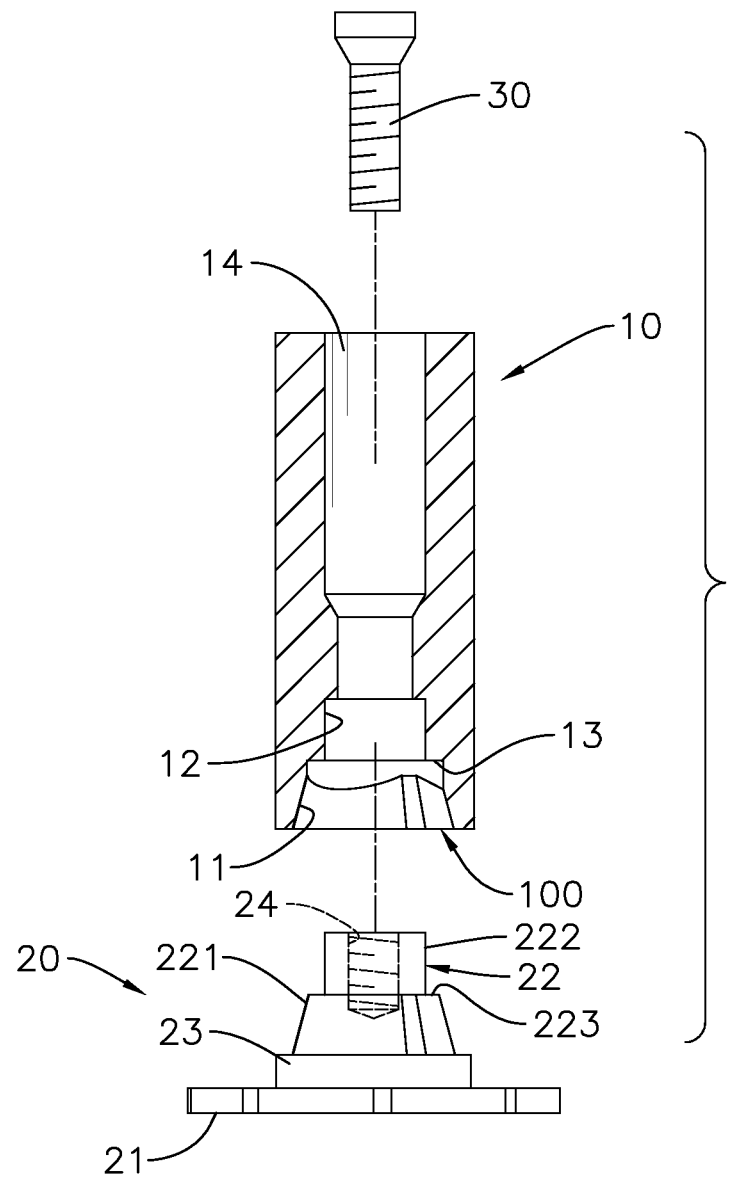
FIG. 2 is an exploded sectional view in accordance with a first embodiment of the present invention.

With reference to FIGS. 1 and 2, a first embodiment of an assembling structure of a processing tool in accordance with the present invention is provided. The assembling structure comprises a clamping handle 10, a processing head 20, and a fixing part 30.

The clamping handle 10 comprises a receiving cavity 100, and selectively forms a through hole 14. The receiving cavity 100 is formed on an end surface of the clamping handle 10 and comprises a recess 11 and a central positioning hole 12, and selectively forms a stepped surface 13. The recess 11 is adjacent to an opening of the receiving cavity 100. Precisely, an inner edge of the end surface of the clamping handle 10 contacts the recess 11. The recess 11 includes a plurality of curved surfaces and radiuses of curvatures of the curved surfaces are the same but centers of curvatures of the curved surfaces are located in different positions. Arc lengths of the curved surfaces of the recess 11 are the same thereby enclosing and evenly dividing the recess 11.

In comparison with the recess 11, the central positioning hole 12 is farther away from the opening of the receiving cavity 100. A sectional shape of the central positioning hole 12 is a circle. In this embodiment, a width of the recess 11 is gradually decreased toward the central positioning hole 12, forming the recess 11 in a conical shape, but a width of the central positioning hole 12 is constant so that an inner wall of the central positioning hole 12 forms a cylindrical surface.

The through hole 14 forms through an axis direction of the clamping handle 10 at a rotating axis of the clamping handle 10, and one end of the through hole 14 communicates with the receiving cavity 100.

The processing head 20 comprises a cutting portion 21 and an assembling portion 22, and selectively comprises a connecting portion 23 and a space 24. The cutting portion 21 is capable of machining a work piece. In other words, the cutting portion 21 may be a blade of the tool 20. The assembling portion 22 is securely mounted on the cutting portion 21 and can be received in the receiving cavity 100 of the clamping handle 10. The assembling portion 22 does not abut the stepped surface 13. As the assembling portion 22 is received in the receiving cavity 100 of the clamping handle 10, the processing head 20 can be securely mounted into the clamping handle 10 at a correct angle during assembling. When the assembling portion 22 is received in the receiving cavity 100, the rotating axis of the clamping handle 10 and a rotating axis of the processing head 20 are aligned.

Precisely, the assembling portion 22 comprises a protrusion 221 and a central positioning column 222, and selectively comprises a stepped surface 223. The protrusion 221 matches the recess 11, and the central positioning column 222 matches the central positioning hole 12. Thus, the protrusion 221 also includes a plurality of curved surfaces, and a number of the curved surfaces of the protrusion 221 equals that of the recess 11. Radiuses of curvatures of the curved surfaces of the protrusion 221 are the same but centers of curvatures of the curved surfaces of the protrusion 221 differ, i.e., located at different positions. In comparison with the protrusion 221, the central positioning column 222 is farther away from the cutting portion 21. In this embodiment, corresponding to the cone-shaped-recess 11, a width of the protrusion 221 is also decreased gradually toward the central positioning column 222, forming the protrusion 221 in another conical shape. Similarly, corresponding to the central positioning hole 12, an inner wall of the central positioning column 222 forms a cylindrical surface, too. The stepped surface 223 of the assembling portion 22 is between the protrusion 221 and the central positioning column 222, and faces to the stepped surface 13 of the clamping handle 10. The stepped surface 13 is between the recess 11 and the central positioning hole 12. A thickness of the protrusion 221 in the axis direction is less than a depth of the recess 11 in the axis direction. Therefore, after assembly, the stepped surface 13 of the clamping handle 10 and the stepped surface 223 of the processing head 20 face to each other, and a gap is formed between the stepped surface 13 of the clamping handle 10 and the stepped surface 223 of the processing head 20. In other words, the whole protrusion 221 can be received in the recess 11 and thus the processing head 20 can be engaged on the clamping handle 10 thoroughly.

Figure 3:
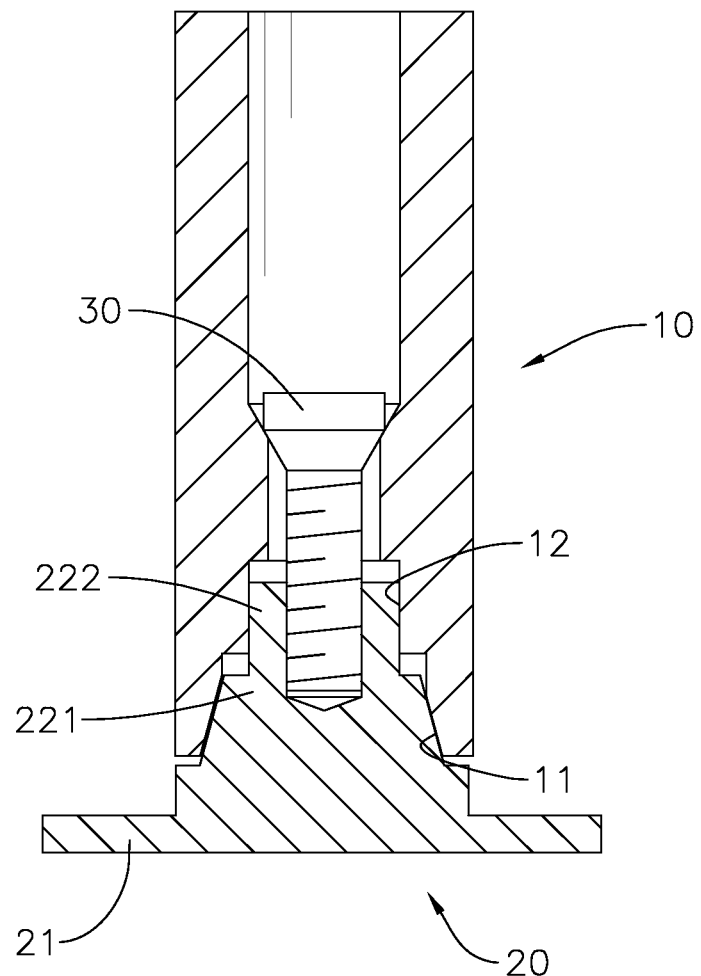
FIG. 3 is a sectional view in accordance with a first embodiment of the present invention, shown assembled without error.
Figure 4:
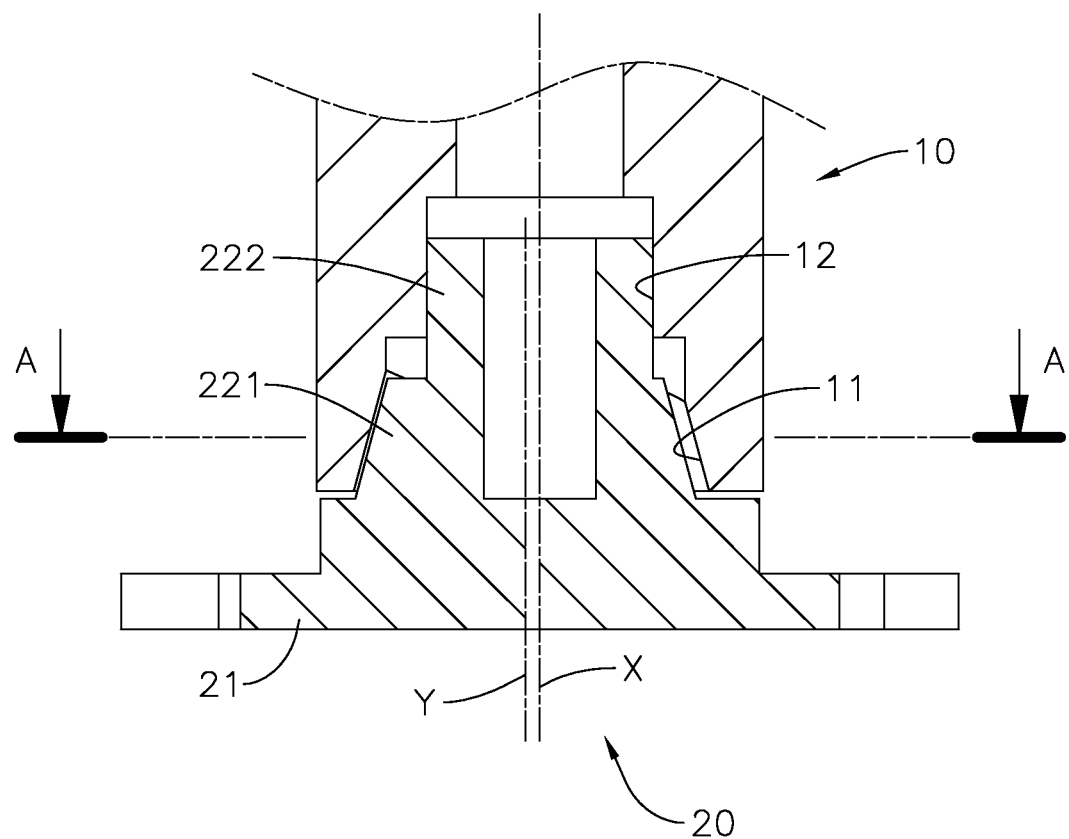
FIG. 4 is a sectional view in accordance with a first embodiment of the present invention, shown assembled with error.
Figure 5:
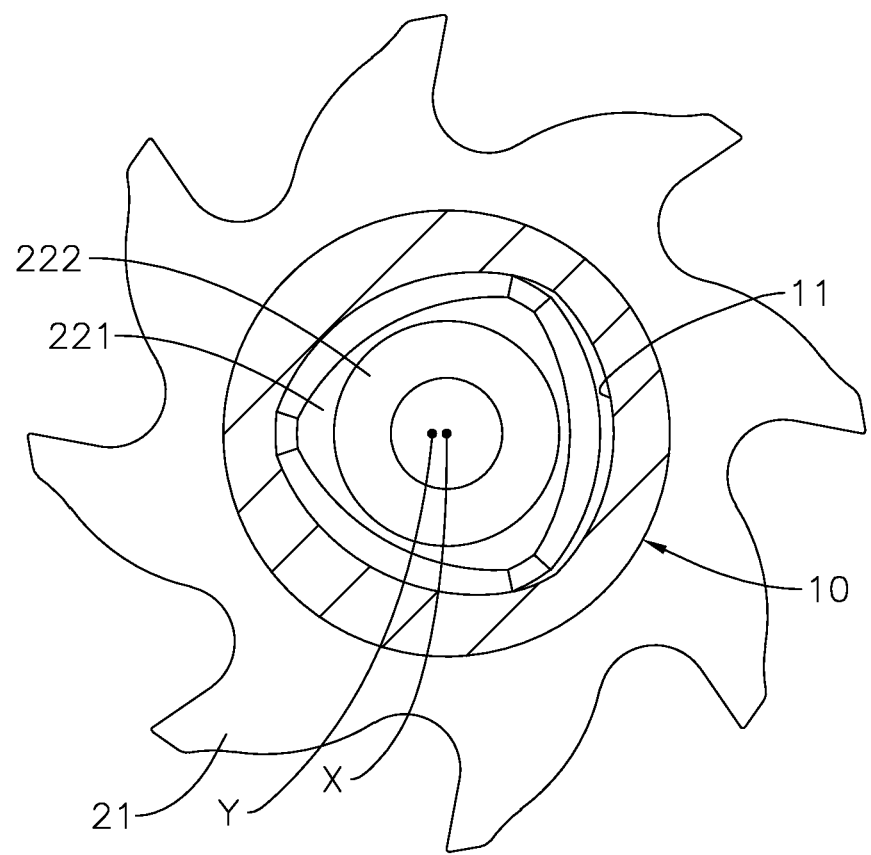
FIG. 5 is a sectional view across line A-A in accordance with a first embodiment of the present invention, shown assembled with error.

Please also refer to FIGS. 3 to 5. In an ideal circumstance as shown in FIG. 3, each surface of the clamping handle 10 and the tool are located at an expected place, so after assembled, the outer wall of the central positioning column 222 of the assembling portion 22 may abut the inner wall of the central positioning hole without any gap and the curved surfaces of the protrusion 221 may also abut the curved surfaces of the recess 11 without any gap.

However, in an actual circumstance as shown in FIGS. 4 and 5, errors may arise during manufacturing and processing. Sectional areas of the central positioning column 222 and the central positioning hole 12 are circles, the precision of the central positioning column 222 and the central positioning hole 12 is higher and thereby centers of circles of the central positioning column 222 and the central positioning hole 12 may be located at the axes of the clamping handle 10 and the processing head 20. However, sectional areas of the recess 11 and the protrusion 221 are not circular, which makes centers of the recess 11 and the protrusion 221 hard to be located at the axes of the clamping handle 10 and the processing head 20. For example, in a hypothetical circumstance, centers of the clamping handle 10, the recess 11, and the central positioning hole 12 are located at an axis X and the centers of the processing head 20 and the central positioning column 222 are also located at the axis X, but the center of the protrusion 221 is located at an axis Y which is deviated from the axis X. Because both of the recess 11 and the protrusion 221 are conical in shape, an amount of the deviation of the centers of the recess 11 and the protrusion 221 (i.e., a distance between the axis X and the axis Y) may only affect a distance of the protrusion 221 in the recess 11, but the curved surfaces of the protrusion 221 are still capable of abutting the curved surfaces of the recess 11 and thereby the clamping handle 10 can drive the processing head 20.

Figure 6A:
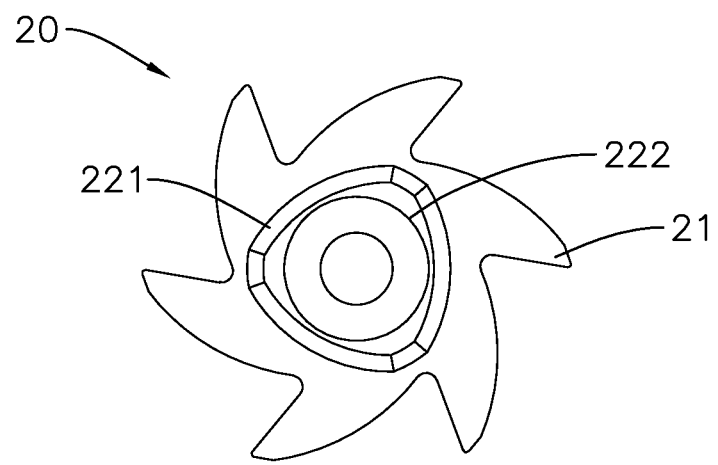
FIG. 6A is a top perspective view of the processing head in another configuration in accordance with a first embodiment of the present invention.
Figure 6B:
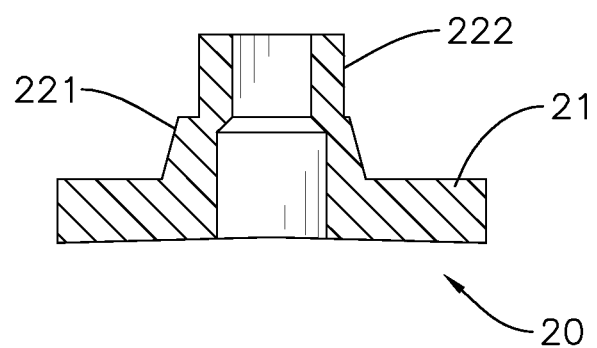
FIG. 6B is a sectional view of the processing head in said another configuration in accordance with a first embodiment of the present invention.
Figure 7A:
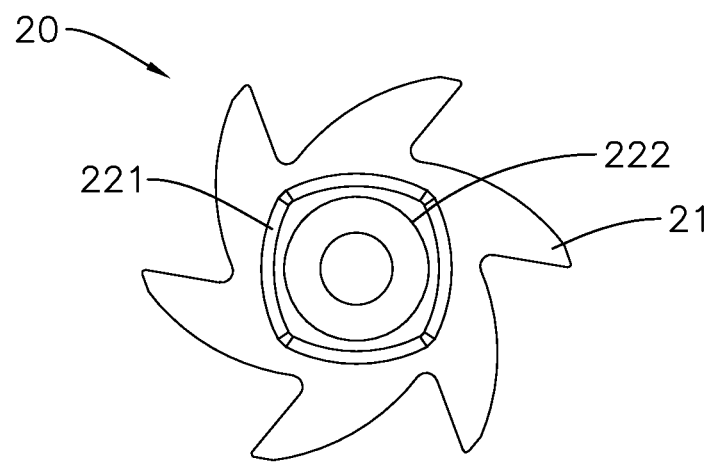
FIG. 7A is a top perspective view of the processing head in still another configuration in accordance with a first embodiment of the present invention.
Figure 7B:
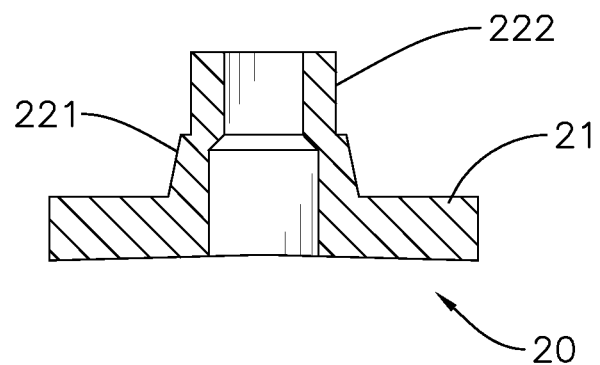
FIG. 7B is a sectional view of the processing head in said still another configuration in accordance with a first embodiment of the present invention.

Please also refer to FIGS. 6A and 6B, which show a different configuration of the processing head 20 in the first embodiment of the present invention. Precisely, the protrusion 221 may comprise three curved surfaces, and each curved surface extends 120 degrees with respect to the rotating axis of the processing head 20. The adjacent two curved surfaces are connected by a round angle. The recess of the clamping handle (not shown in the figures) corresponds to the protrusion 221 in shape, therefore matching the protrusion 221. Then please refer to FIGS. 7A and 7B, which show another configuration of the processing head 20 in the first embodiment of the present invention. The protrusion 221 may comprise four curved surfaces so that each curved surface extends 90 degrees with respect to the rotating axis of the processing head 20. The recess of the clamping handle (not shown in the figures) corresponds to the protrusion 221 in shape, therefore matching the protrusion 221. However, the shapes of the protrusion 221 and the recess are not limited thereto.

Then please refer to FIGS. 1 and 2 again. The connecting portion 23 is located between the cutting portion 21 and the assembling portion 22, and the assembling portion 22 is securely mounted on the cutting portion 21 via the connecting portion 23. In this embodiment, the cutting portion 21, the assembling portion 22, and the connecting portion 23 are formed integrally. A shape and dimensions of a sectional area of the connecting portion 23 are identical to those of the clamping handle 10. Therefore, after assembled, the surface of the connecting portion 23 abutting the clamping handle 10 is the end surface of the clamping handle 10 that forms the receiving cavity 100, and an outer wall surface of the connecting portion 23 and an outer wall surface of the clamping handle 10 are connected to each other and thereby form a cylindrical surface. With the connecting portion 23, the cutting portion 21 may be separated from the clamping handle 10, which reduces the chance of damaging the clamping handle 10 during operation.

The space 24 is concaved in a surface of the processing head 20, and said surface faces to the clamping handle 10. In other words, the space 24 is formed in the assembling portion 22. Precisely, the space 24 is concaved along the rotating axis of the processing head 20, so the space 24 faces to and communicates with the through hole 14 of the clamping handle 10. An inner wall of the space 24 may form threads.

The fixing part 30 is capable of connecting the clamping handle 10 and the processing head 20. In this embodiment, the fixing part 30 is put into the through hole 14 of the clamping handle 10 from an end of the clamping handle 10, and said end is farther from the processing head 20, so the fixing part 30 can be screwed on threads on an inner wall of the through hole 14. A portion of the fixing part 30 extends into the receiving cavity 100 of the clamping handle 10, so that the fixing part 30 can be screwed on the thread on the inner wall of the space 24. Therefore, the clamping handle 10 and the processing head 20 are connected to and fixed on each other.

With aforesaid structure, when the processing head 20 is fixed on the clamping handle 10, the assembling portion 22 of the processing head 20 is put into the receiving cavity 100 of the clamping handle 10. Precisely, when the assembling portion 22 is put into the receiving cavity 100, the central positioning column 222 of the assembling portion 22 may be moved into the central positioning hole 12 of the receiving cavity 100. Because the central positioning hole 12 is farther from the opening of the receiving cavity 100, when the central positioning column 222 is moved into and abutted the central positioning hole 12, the rotating axis of the processing head 20 can be aligned to the rotating axis of the clamping handle 10, so that the two rotating center axes are arranged in one line. In other words, through the central positioning column 222 abutting the central positioning hole 12, the rotating axis of the processing head 20 may be prevented from being oblique to the rotating center axis of the clamping handle 10. Besides, sectional areas of both the central positioning column 222 and central positioning hole 12 are circles, so the processing head 20 can be put into the clamping handle 10 at any angle.

Then, after the assembling portion 22 is further moved into the receiving cavity 100, the protrusion 221 also can be moved into and abutted the recess 11. Because the sectional areas of both the protrusion 221 and the recess 11 are not circular, and the thickness of the protrusion 221 is lesser than the depth of the recess 11 in the axis direction, the processing head 20 needs to be rotated with respect to the rotating axis for moving into the recess 11, which assists with securely mounting the processing head 20 on the clamping handle 10 at a correct angle. After the above two steps, the assembling portion 22 is put into the receiving cavity 100, and thereby the processing head 20 may not be oblique to the clamping handle 10 and at a correct angle. In addition, with the width of the recess 11 and protrusion 221 are gradually decreased in the axis direction, when the protrusion 221 is moved into and abuts the recess 11, even though the processing head 20 is moved at a wrong angle with respect to the axis direction, the protrusion 221 still can be moved along the recess 11 with the gradually decreased width. Therefore, the protrusion 221 can be rotated along the recess 11 to the correct angle and thereby moved into the recess 11, so the assembly process is simplified.

Finally, the processing head 20 is fixed on the clamping handle 10 via the fixing part 30.

Figure 8:
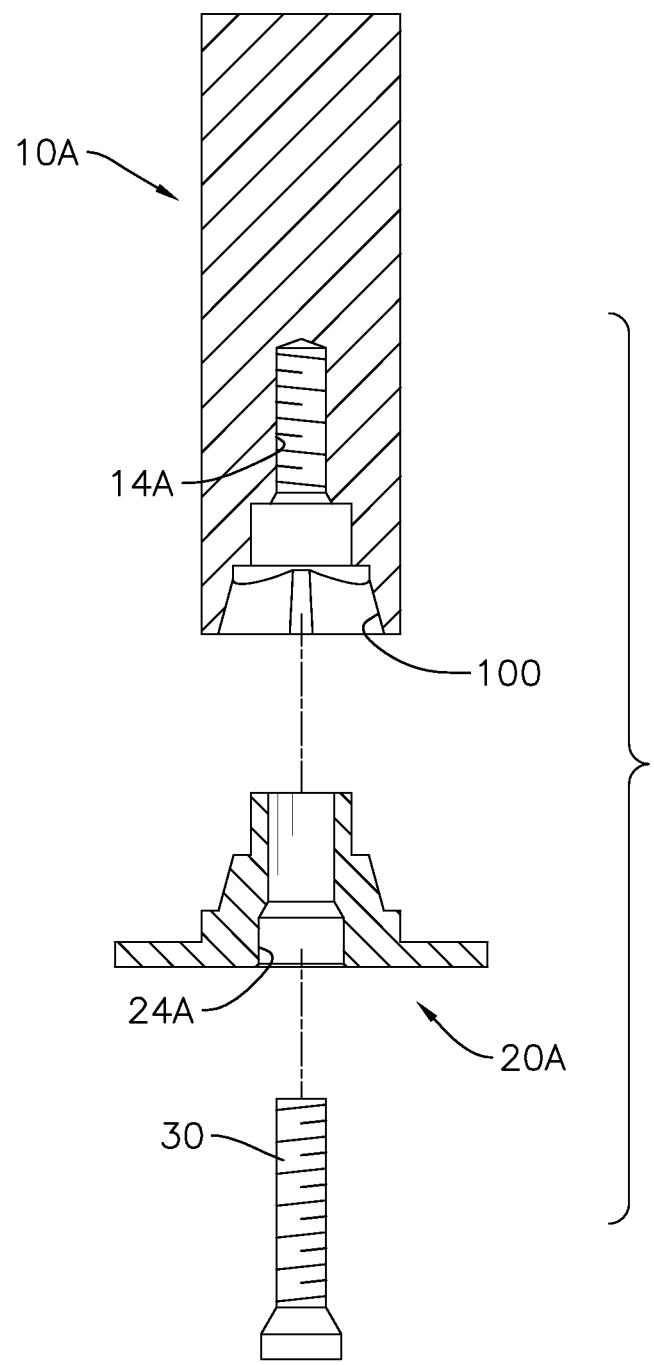
FIG. 8 is an exploded sectional view in accordance with a second embodiment of the present invention.
Figure 9:
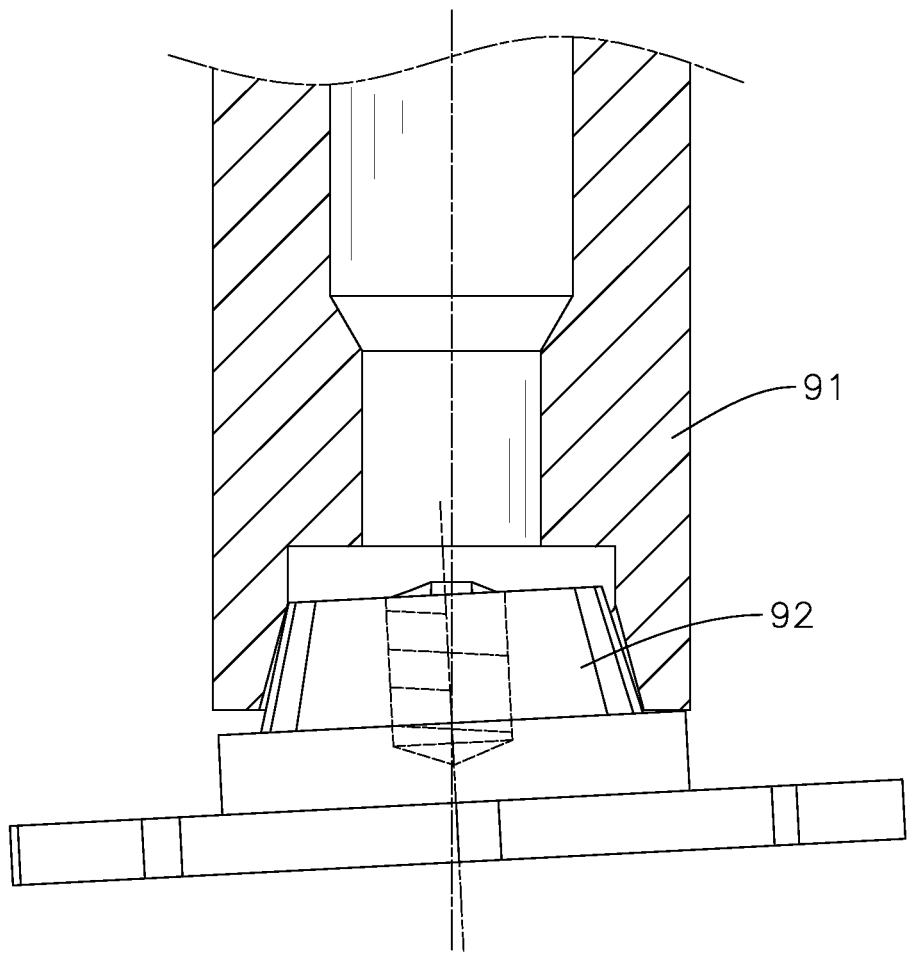
FIG. 9 is a perspective view of the processing head obliquely mounted on the clamping handle in accordance with a prior art.
Figure 10:
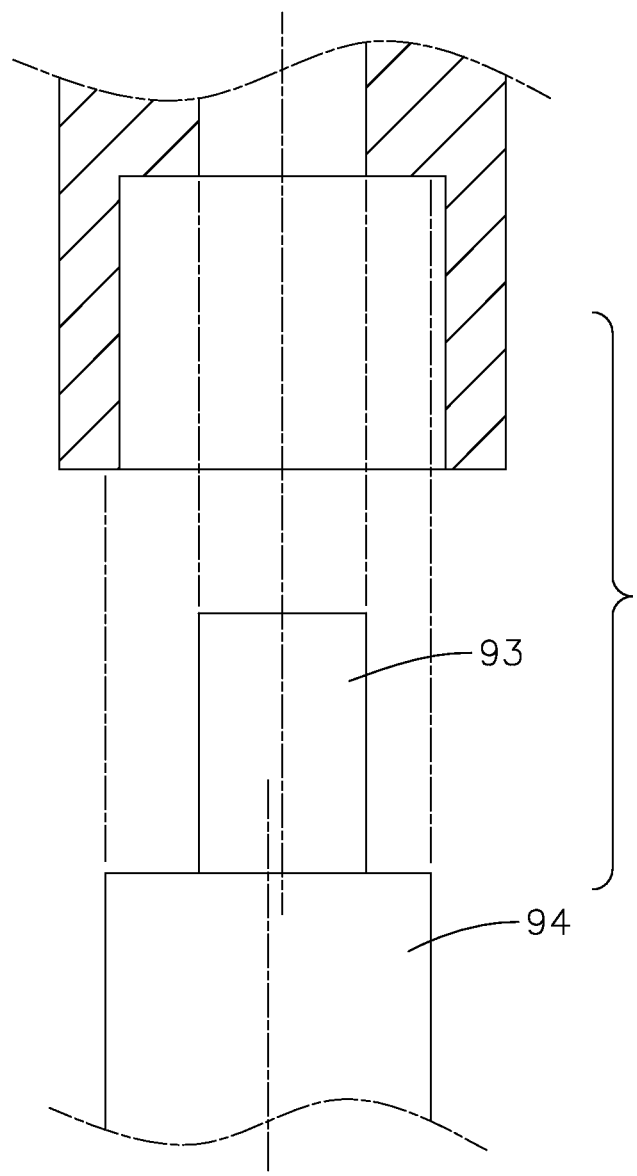
FIG. 10 is a perspective view of the processing head, which obliquely cannot be put into the clamping handle because of errors in accordance with a prior art.

Then please refer to FIG. 8. In a second embodiment of the present invention, technical features are similar to those of the first embodiment, but one difference is the clamping handle 10A does not comprise a through hole but comprises a space 14A instead, and the processing head 20A does not comprise a space but comprises a through hole 24A instead. In other words, in comparison to the first embodiment, the through hole and the space are arranged vice versa in their relations with the clamping handle and the tool to be the second embodiment. Precisely, the space 14A is concaved in the clamping handle 10A and in the receiving cavity 100, formed along a center of the clamping handle 10A, and extended toward one side of the processing head 20A. The through hole 24A is formed through a rotating axis of the processing head 20A, and an inner wall of the through hole 24A may form threads. Therefore, the processing head 20A is connected to and fixed on the clamping handle 10A through the fixing part 30 screwed on both the clamping handle 10A and the processing head 20A. Precisely, the fixing part 30 is put into the through hole 24A from an end of the processing head 20A, said end is farther from the clamping handle 10A, and then a portion of the fixing part 30 is moved into the space 14A of the clamping handle 10A.

The receiving cavity 100 of the clamping handle 10 has the recess 11 and the central positioning hole 12 that are different in dimensions, and the assembling portion 22 of the processing head 20 has the protrusion 221 corresponding to the recess 11 and the central positioning column 222 corresponding to the central positioning hole 12. When assembling the clamping handle 10 and the processing head 20, the assembling portion 22 of the processing head 20 is put into the receiving cavity 100 of the clamping handle 10 in two steps. Through the two steps, the rotating axis of the processing head 20 and the rotating axis of the clamping handle 10 can be aligned to each other, and the processing head 20 needs to be rotated to correct the angle for engaging with the clamping handle 10. Therefore, the processing head 20 can be securely mounted on the clamping handle 10 and is not oblique to the clamping handle 10 in any direction, and thereby the processing head 20 may not be detached from the clamping handle 20 because of vibrations during a machining process. Besides, with the recess 11 being in a conical shape and the width of the recess 11 gradually decreased toward the central positioning hole 12, and with the protrusion 221 being in a conical shape and the width of the protrusion 221 gradually decreased toward the central positioning column 222, even any one of the recess 11 and the protrusion 221 has an error during manufacturing, the processing head 20 still can be mounted on the clamping handle 10. Further, when the clamping handle 10 changes the rotation direction, the curved surfaces of the protrusion 221 are kept abutting the curved surfaces of the recess 11 just like without the error.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed. Any simple modifications, equivalent changes and modifications based on the substantial technical feature of the present invention without deviating from the technical solution of the present invention still fall within the scope of the technical solution of the present invention.

What is claimed is:

1. A positioning assembling structure of a center of a processing tool comprising:
a clamping handle comprising a receiving cavity; the receiving cavity formed at an end surface of the clamping handle and comprising:
a recess adjacent to an opening of the receiving cavity; the recess including:
a plurality of curved surfaces, radiuses of curvatures of the curved surfaces being the same but centers of the curvatures of the curved surfaces being different; and
a central positioning hole, wherein a wall of the central positioning hole is a cylindrical surface; the central positioning hole being farther from the opening of the receiving cavity than the recess; a width of the recess gradually decreased toward the central positioning hole thereby forming the recess in a conical shape;
a processing head comprising:
a cutting portion configured to machine a workpiece; and
an assembling portion configured to be received in the receiving cavity of the clamping handle, securely mounted on the cutting portion, and comprising:
a protrusion matching and received in the recess; the protrusion including:
a plurality of curved surfaces, a number of the curved surfaces of the protrusion being equal to that of the curved surfaces of the recess; radiuses of curvatures of the curved surfaces of the processing head being the same but centers of the curvatures of the curved surfaces of the processing head being different; and
a central positioning column configured to match and be received in the central positioning hole, a wall of the central positioning column being a cylindrical surface; the central positioning column being farther from the cutting portion than the protrusion; a width of the protrusion gradually decreased toward the central positioning column thereby forming the protrusion in a conical shape; and
a fixing part connected with the clamping handle and the processing head;
wherein when the assembling portion is received in the receiving cavity, each one of the curved surfaces of the protrusion abuts a respective one of the curved surfaces of the recess, the wall of the central positioning column abutting the wall of the central positioning hole and a rotating axis of the clamping handle and a rotating axis of the processing head are arranged in a line.

2. The positioning assembling structure of a center of a processing tool as claimed in claim 1, wherein:
the receiving cavity of the clamping handle further comprises:
a stepped surface located between the recess and the central positioning hole;
the assembling portion of the processing head also comprises
a stepped surface located between the protrusion and the central positioning column; and
a thickness of the protrusion in a direction parallel to the rotating axis of the processing head is lesser than a depth of the recess in said direction; the stepped surface of the clamping handle faces to the stepped surface of the processing head, and a gap is formed between the stepped surface of the clamping handle and the stepped surface of the processing head.

3. The positioning assembling structure of a center of a processing tool as claimed in claim 1, wherein the processing head further comprises:
a connecting portion located between the cutting portion and the assembling portion and thereby the assembling portion securely mounted on the cutting portion via the connecting portion; sectional dimensions and a sectional shape of the connecting portion being identical to those of the clamping handle.

4. The positioning assembling structure of a center of a processing tool as claimed in claim 1, Therein:
the clamping handle further comprises
a through hole formed through the rotating axis of the clamping handle;
the processing head further comprises
a space concaved in a surface of the processing head, and facing and communicating to the through hole of the clamping handle; said surface of the processing head facing to the clamping handle; and
the fixing part is mounted through and screwed in the through hole and the space.

5. The positioning assembling structure of a center of a processing tool as claimed in claim 1, wherein:
the clamping handle further comprises:
a space concaved in a surface of the clamping handle, said surface of the clamping handle facing to the processing head;
the processing head further comprises:
a through hole formed through the rotating axis of the processing head, and facing and communicating to the space of the clamping handle; and
the fixing part is mounted through and screwed in the through hole and the space.

6. The positioning assembling structure of a center of a machine tool as claimed in claim 2, wherein the processing head further comprises:
a connecting portion located between the cutting portion and the assembling portion and thereby the assembling portion securely mounted on the cutting portion via the connecting portion; sectional dimensions and a sectional shape of the connecting portion being identical to those of the clamping handle.

7. The positioning assembling structure of a center of a machine tool as claimed in claim 2, wherein:
the clamping handle further comprises
a through hole formed through the rotating axis of the clamping handle;
the processing head further comprises
a space concaved in a surface of the processing head, and facing and communicating to the through hole of the clamping handle; said surface of the processing head facing to the clamping handle; and
the fixing part is mounted through and screwed in the through hole and the space.

8. The positioning assembling structure of a center of a machine tool as claimed in claim 2, wherein:
the clamping handle further comprises:
a space concaved in a surface of the clamping handle, said surface of the clamping handle facing to the processing head;

the processing head further comprises:
 a through hole formed through the rotating axis of the processing head, and facing and communicating to the space of the clamping handle; and
the fixing part is mounted through and screwed in the through hole and the space.

9. The positioning assembling structure of a center of a machine tool as claimed in claim 3, wherein:
the clamping handle further comprises
 a through hole formed through the rotating axis of the clamping handle;
the processing head further comprises
 a space concaved in a surface of the processing head, and facing and communicating to the through hole of the clamping handle; said surface of the processing head facing to the clamping handle; and
the fixing part is mounted through and screwed in the through hole and the space.

10. The positioning assembling structure of a center of a machine tool as claimed in claim 3, wherein:
the clamping handle further comprises:
 a space concaved in a surface of the clamping handle, said surface of the clamping handle facing to the processing head;
the processing head further comprises:
 a through hole formed through the rotating axis of the processing head, and facing and communicating to the space of the clamping handle; and
the fixing part is mounted through and screwed in the through hole and the space.

* * * * *